3,632,495
CORROSION TEST PROBE ASSEMBLY
Frederick D. Watson and Weldon D. Mayse, Houston, Tex., assignors to Petrolite Corporation, St. Louis, Mo.
Filed June 2, 1969, Ser. No. 829,614
Int. Cl. B01k 3/02
U.S. Cl. 204—195 C                                         8 Claims

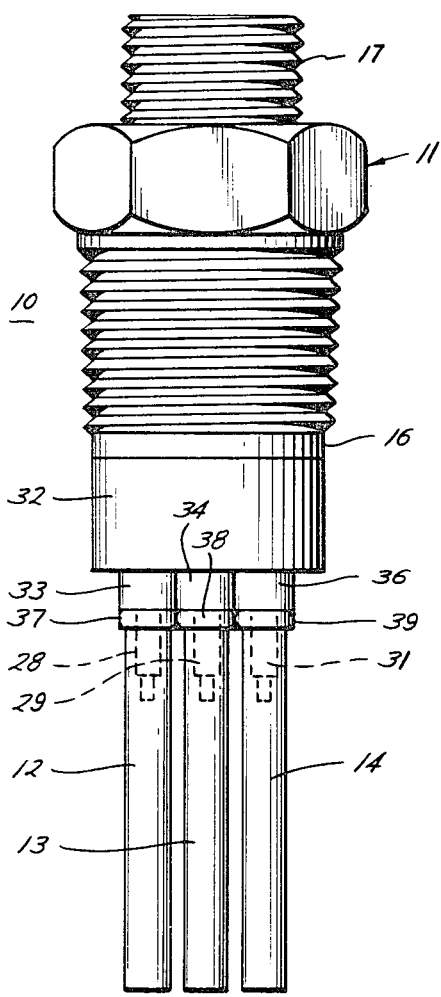
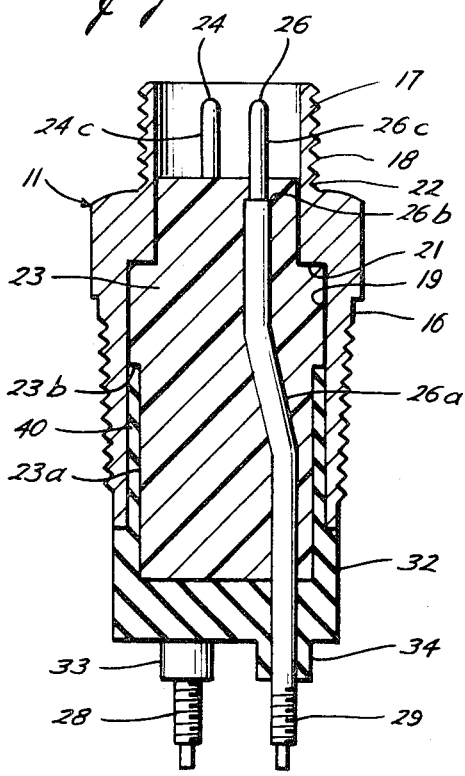
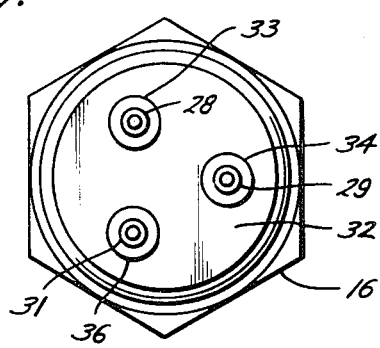
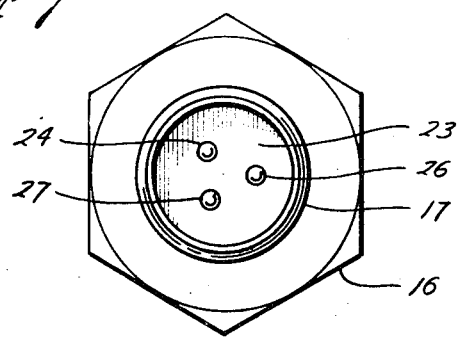
Frederick D. Watson
Weldon D. Mayse
INVENTORS
BY Emil J. Bednar
ATTORNEY United States Patent Office 3,632,495
Patented Jan. 4, 1972

ABSTRACT OF THE DISCLOSURE

A corrosion test probe assembly formed of a base and metallic electrodes. The base includes a tubular metallic body with one end of polygonal configuration and the other end with a threaded exterior surface. A rigid insulator member resides in a passageway in engagement with an abutting shoulder in the body. Electrical conductors are integrally carried in the member and extend from one end into a sleeve on the body to form an external circuit connector and from the other end to receive by threaded interconnection metallic electrodes which can be immersed within a corrodant. A resilient elastomer molded onto the body and the member provides; a fluid-tight seal, enclosure of the exposed end of the member adjacent the metallic electrodes and cylindrical raised parts forming axial sealing surfaces encircling the conductors. Insulating fluid seals about the conductors are engaged axially in fluid-tightness between the raised sealing surfaces of the elastomer and the electrodes.

BACKGROUND OF THE INVENTION

(1) Field of the invention

This invention relates to measuring and testing of corrosion processes, and it relates more particularly to the instruments and electro-chemical techniques used in the study of corrosion processes.

(2) Description of the prior art

It is often desirable to determine the rates at which metals corrode within a corrosive liquid. For example, corrosion inhibitors are added to aqueous liquids to reduce the corrosion of exposed metals. Instruments are used to measure the rates at which these metals corrode so that the effectiveness of the inhibitor can be determined. The measurement of the rate of corrosion upon metals usually involves an instrument associated with a probe formed of an assembly of a base which carries a plurality of electrodes immersed within the corrosive liquid. In refineries, petrochemical plants, and other process industries using large volumes of aqueous fluids, the probes are usually installed within the piping system carrying the fluid desired to be monitored. Additionally, probes have been placed in other uses, such as in monitoring the rate of corrosion of metals forming oil field pipelines containing waters that are employed to stimulate oil production from subterranean reservoirs.

The probes must be readily interconnected into the piping system carrying aqueous fluids so that their electrodes are exposed to the corrodant. Whatever the construction of the probes, their placement into the piping must not create a weakness. For example, probes using plastics should be used only in environments where there is insignificant chemical and physical attack upon the particular plastics. The probe must be structurally sound irrespective of operating conditions. A failure of the probe by leakage or blow-out, can cause a severe economic loss when the piping system provides an essential processing link. Under these circumstances, the entire process could be temporarily interrupted while the probe is being replaced.

In many instances, the probe will be installed within a by-pass piping circuit so that it can be readily removed. This arrangement permits the field replacement of its electrodes. The field replacement of electrodes in a probe is of great advantage. The probe's electrodes can be replaced to eliminate effects of previous corrosion or exposure to inhibitors. Additionally, the electrodes may be examined to measure the actual weight loss suffered during exposure to the corrodant. Preferably, the exact same surface area exposure must be maintained between all electrodes interchanged on the probe. Otherwise, the probe must be recalibrated to insure consistent results in a measurement technique after each replacement of the electrodes. The electrodes will be changed in the field, and usually by non-technical personnel. Therefore, the changing of the electrodes cannot require sophisticated measurement or replacement techniques. For example, the exposed surface areas of the electrodes carried on the probe's base cannot depend upon making certain measured engagements relative to a mounting or sealing surface.

In addition, the probe assembly of base and electrodes must not require special handling, placement or tools not normally required in the maintaining of the piping system. Preferably, the probe assembly looks and is handled like a regular pipe fitting. The probe assembly should not contain any materials (other than possibly the electrodes) which are more corrodible in the aqueous fluid than the piping system. Thus, the probe cannot be the weakest link in the piping system.

The probe assembly of the present invention is especially suited for use in accordance with the "Method and Apparatus For Determining Corrosion Rate" disclosed in U.S. Pat. 3,406,101. This patent describes a technique wherein is employed a corrosion rate meter that includes a probe having three electrodes adapted to be exposed to a corrosive liquid, an adjustable current source, an ammeter and a high impedance voltmeter as primary components. The adjustable current source applies a small electric current between a "test" electrode and an "auxiliary" electrode. At the same time, the voltmeter monitors the polarization potential between the "test" electrode and a "reference" electrode. The current flow slightly polarizes the surface of the "test" electrode, and as a result, causes a shift in the potential between the "test" and "reference" electrodes. The current flow required to produce 10 millivolts polarization is directly proportional to the corrosion rate of the "test" electrode undergoing corrosion.

In this technique, appropriate constants and adjustments of exposed surface area of the "test" electrode can be used so that the ammeter is calibrated directly in the desired units of corrosion rate providing the surface area of the "test" electrode remains constant in exposed surface. Thus, the probe must be arranged so that all the "test" electrodes, when exposed to corrosion, maintain a substantially constant exposed surface area.

Although the electrodes can be manufactured with certain identical exposed surface areas, the corrodant causes their exposed surfaces to become pitted and otherwise damaged. Eventually, the probe must be either discarded, or the electrochemical technique recalibrated for the new characteristic which the electrodes have assumed. Usually the latter occurrence is avoided by substituting a new probe assembly, or by replacing the electrodes on the existing probe assembly.

It is the purpose of this invention to provide a corrosion test probe assembly of a base and electrodes which can be readily installed in a piping system without introducing a weakness thereto or one requiring special piping techniques. Additionally, the electrodes on the probe base can be readily replaced by non-technical personnel without requiring recalibration of the corrosion measurement technique. Furthermore, the corrosion test probe assembly can be readily manufactured from selected components and used at extreme environmental conditions.

SUMMARY OF THE INVENTION

In accordance with this invention, there is provided a corrosion test probe assembly suitable for determining the rate of corrosion of a metallic material in a corrodant by means of polarization measurements. A rigid body is provided with an axial passageway and carries a abutting shoulder adjacent to the passageway. A rigid insulator member is positioned in the passageway and engages the abutting shoulder so that axial movement of the member within the body is restrained in at least one direction. A resilient seal extends between the member and body to seal meeting surfaces of the member and body into a fluid tight relationship. A plurality of metallic terminal pins are integrally carried in the member in electrical isolation and extend from one of its ends. A plurality of metallic electrodes are secured at the exposed ends of these pins. Insulating fluid seals surround these pins and are engaged axially in fluid tightness between presented sealing surfaces associated with the member and on the electrodes. Separate electrically conductive means extend through the member from these pins. The conductive means are insulated from each other and the body so that electrical conductive means form electrical circuits through the electrodes during polarization measurements.

BRIEF DESCRIPTION OF THE DRAWINGS

FIG. 1 is a prospective view of the probe assembly of this invention;

FIG. 2 is a reduced-dimensional vertical section of the probe assembly shown in FIG. 1 (the views of FIGS. 1 and 2 being rotated 60° from one another);

FIG. 3 is a top plan view of the probe assembly shown in FIG. 2; and

FIG. 4 is a bottom plan view of the probe assembly shown in FIG. 2.

DESCRIPTION OF SPECIFIC EMBODIMENTS

In FIG. 1, there is illustrated one embodiment of a corrosion test probe assembly 10 which can be secured within a piping system carrying a corrodant whose effect upon metallic substances is to be determined.

The probe assembly 10 is comprised of a base 11 upon which are carried two or more electrodes 12, 13 and 14. Electrical connection of the probe assembly 10 to an external corrosion rate meter (not shown) can be effected by an electrical connector 17 carried atop the base 11. The electrodes are connected by insulated electrically conductive means within the base 11 to the connector 17. Thus, a corrosion rate meter is readily connected to the probe assembly 10 and electrical circuits are provided to the electrodes 12, 13 and 14 during polarization measurements. The probe assembly 10 can be constructed of any suitable physical form so that it can be readily secured to the piping system carrying the corrodant to be monitored. Preferably, probe assembly 10 is constructed in the form of a pipe plug compatible with the piping system. Thus, one end of the base 11 can have a polygonal configuration and the other end can be formed with a lower cylindrical portion having a threaded exterior side surface.

The electrodes 12, 13 and 14 may extend longitudinally from the bottom of the base 11 in any side-by-side relationship. However, it is preferred to mount the electrodes in a triangular relationship to reduce electrical coaction between the electrodes when immersed in the corrodant.

Referring to FIGS. 2, 3 and 4, the base 11 includes a rigid, preferably metallic, body 16. The body 16 is provided with an axial passageway 19 and carries an abutting shoulder 21 adjacent the passageway 19. The connector 17 is provided by a sleeve 22 with external threads 18 integrally carried at one end of the body 16. A rigid insulator member 23 resides within the passageway 19 and engages the shoulder 22. As a result, axial movement of the member 23 is restrained against undesired displacement in at least one axial direction. Obviously, the present arrangement prevents fluid pressure exerted on the lower portion of the probe assembly 10 from displacing the member 23 from the passageway 19 into the sleeve 22. It will be apparent that the abutting shoulder 22 may be placed at a different location on the body 16 and the member 23 adapted to operatively engage the shoulder 22. Preferably, the passageway 19 and the member 23 have complementary cylindrical surfaces so that the member 23 may be received into the body 16 with a relatively tight fit.

The insulator 23 may be formed of any suitable material which is structurally rigid and has a high electrical resistivity. The insulator 23 integrally carries electrical conductors embedded therein. Thus, member 23 maintains the electric conductive means between the connector 17 and the electrodes 2, 13 and 14 electrically insulated from one another and the body 16. The member 23 may be formed of a variety of substances such as hard rubber, various synthetic polymeric materials, laminated phenol materials, plastics, etc. However, it is preferred that the member 23 be formed of an epoxy polymer which contains fiberglass reinforcement. This material is commonly called "glass-filled epoxy" and is available commercially under the trade name of "Kimlox BH." This material (glass-filled epoxy) is ideally suited for the membr 23 since it provides exceptional electrical insulative properties while maintaining a rigid structure for carrying the electrical conductors which extend between the connector 17 and the electrodes of the probe assembly 10.

Metallic conductors 24, 26, 27 are integrally carried in the member 23 in electrical isolation from one another. These conductors extend from one end of the member 23 remote from the connector 17 to form terminal pins 28, 29 and 31. These terminal pins are adapted, such as by threads, to receive the electrodes 12, 13 and 14. Preferably, the metallic conductors are formed by metal rods which are integrally carried in the member 23. The conductors also extend from the member 23 into the sleeve 22 to form the connector 17. Thus, one end of the conductors is threaded to receive metallic electrodes whereas the other end of the conductors cooperates with the sleeve 22 extending from the upper portion of the body 16 to form the connector 17. If desired, separate terminal pins and connector pins can be integrally carried in the member 23 and electrically interconnected by wire leads.

Preferably, the metallic conductors 24, 26 and 27 are arranged with certain structural features whereby the terminal pins, and end portions providing the connector 17, resist longitudinal and radial displacing forces. For this purpose, the conductors 24, 26 and 27 are provided with intermediate non-linear portions that are embedded in the insulator member 23. The non-linear portions for the conductors all may be formed by a bend 26a as is illustrated in FIG. 2 for the conductor 26. However, these non-linear portions may be provided by non-circular cross-sectional portions formed on the conductors. The use of bends in the conductors has advantages in that both longitudinal and radial displacing forces are resisted while also permitting the conductors to be spacially arranged for maintaining uniform electrical spacings in the body 16.

The conductors 24, 26 and 27, may also have abutment shoulders, such as shoulders 26b on conductor 26, embedded in the insulator member 23. These shoulders resist longitudinal displacement of the conductors from the member 23. Additionally, these shoulders may be formed be reduced diameter end portions, such as portions 24c and 26c, on all the end portions of the conductors which cooperate with the sleeve 22 in forming the connector 17.

In some embodiments, and additional conductor can be embedded into the member 23 and connected to the body 16, or other metal piece, to provide an electrical ground. In this case, the conductor can extend into the sleeve to provide a ready electrical circuit at the connector 17.

A resilient seal 32 extends between the member 23 and the body 16 to seal their meeting surfaces into a fluid tight relationship. The resilient seal 32 preferably encloses the lower extremity of the member 23 from which protrude the terminal pins 28, 29 and 31. The resilient seal 32 may be formed into standoffs or clindrical raised sealing surfaces 33, 34 and 36 which encircle each of the terminal pins and provide a surface transverse thereto upon which an axially engaged fluid seal can be effected.

Referring monmentarily to FIG. 1, it will be noted that the electrodes 12, 13 and 14 are threaded upon the terminal pins 24, 26 and 27 for ready installation and replacement as desired. It is essential that the surface areas of the electrodes exposed to the corrodant be maintained constant. Thus, it is necessary to isolate fluid-wise the terminal pins 28, 29 and 31 from the electrodes and any other metallic material which is in electrical communication with these electrodes. The cylindrical raised sealing surfaces 33, 34 and 36 may provide insulating fluid seals encircling the terminal pins and engaged axially in fluid tightness to the presented sealing surfaces on the ends of the electrodes. Better results are obtained when the insulating fluid seal is provided by a separate element. For example, O-rings 37, 38 and 39 formed of any suitable resilient material are mounted about the terminal pins. The O-rings are engaged axially into fluid tightness between the presented sealing surfaces associated with the member 23, namely the raised cylindrical sealing surfaces 33, 34 and 36, and the electrodes 12, 13 and 14. Thus, the exterior surface areas of the electrodes exposed to the corrodant are strictly controlled. In this regard, the resilient seal 32 prevents fluid leakage between the member 23 and the body 16. Additionally, the seal 32 can provide raised sealing surfaces 33, 34 and 36 so that the terminal pins 28, 29 and 31 may be maintained in electrical isolation from the corrodant.

In one preferred aspect of the probe assembly 10, the member 23 has a reduced diameter cylindrical surface 23a formed on its portion adjacent the terminal pins. A shoulder 23b forms a downstream stop on the member 23. Thus, an annular space 40 is provided between the meeting surfaces of the member 23 and the interior cylindrical surface of the passageway 19 formed in the body 16. The resilient seal 32 is extended into this annular space 40 and held rigidly downstream by shoulder 23b to provide an improved (pressure actuated) fluid seal between the meeting surfaces of the member 23 and the body 16. The seal 32 additionally serves as a mechanical lock to hold the member 23 within the body 16 against displacement from the passageway 19.

The resilient seal 32 may be provided in any suitable manner. However, it has been found that use of an elastomeric material which is thermal setting for the seal 32 permits manufacturing an integrally contained and structurally rigid probe assembly 10. Also, an elastomer permits thermal expansion in the base 11 while maintaining fluid tightness between the body 16 and member 23. For example, an elastomer such as Viton (a trademark of Haveg Corp.) may be molded under pressures of about 5000 p.s.i. and 300° F. in an injection mold assembly into the shape illustrated in FIG. 2. The "Viton" flows into the voids between the meeting surfaces of the member 23 and the body 16. It also encloses the exposed extremity of the member 23 and can provide the raised cylindrical sealing surfaces 33, 34 and 36. Thus, the manufacturing steps for the probe assembly 10 are greatly reduced in number since the resilient seal 32 provides a multitude of structural functions in only one molding operation. Additionally, the unitary probe assembly 10 has the necessary structural rigidity and fluid tightness to be useable in substantially all piping systems and in a variety of corrosive aqueous fluids or other corrodants. The only limitation being corrodants which contain a substance that destroys the elastomer which forms the resilient seal 32.

As previously mentioned, the configuration of the body 16 is relatively unimportant to the present invention. However, the structural arrangement of the probe assembly 10 permits its manufacture in relatively small sizes. For example, the probe assembly 10 has been manufactured with the body 16 in the form substantially of a 1" NPT pipe plug.

Although the probe assembly 10 has been described as being formed essentially of a base 11 and a plurality of electrodes 12, 13, and 14, it will be apparent that the base 11 may be used with a variety of electrodes. For example, the electrodes may be formed of various like or different metals and may have different sizes where the corrosion test is so adapted. Thus, the base 11 may be manufactured and employed separately and apart from the electrodes with which it finds its ultimate utility. Although the base 11 may be used with a variety of electrodes, it has good utility when employed with dimensionally identical electrodes, such as illustrated in electrodes in FIG. 1. For this purpose, the electrodes are counterbored at one end and carry internal threads which are adapted to be threadedly engaged upon the terminal pins 28, 29 and 31. The terminal pins carry a reduced diameter end portion which forms a metal to metal seat in the bottom of the threaded opening formed within the electrodes. Thus, the electrodes may be replaced one at a time or as a group upon the base 11 and threaded into position with the metal-to-metal stop being formed and protecting the O-rings 37, 38 and 39 against excessive compression or mechanical destruction. Thus, the metal-to-metal abutment between the terminal pins and electrodes, and the precise space thereby provided, create the desired sealing function for the insulating fluid seals which encircle the terminal pins.

Although the insulating fluid seals may be of any suitable type, it is preferred to employ an O-ring formed of Viton (trademark). Thus, the material forming the insulating fluid seals and the resilient seal 32 has the same physical properties and chemical reaction to the corrodant to be monitored by the probe assembly 10.

The electrodes may be formed of any suitable conductive material. Preferably the electrodes are fabricated from 10–20 mild steel. However, materials such as iron, aluminum, copper, brass, lead, nickel, titanium, tantalum, zirconium, chromium and alloys thereof may be used under similar conditions.

Various modifications and alterations in the described probe assembly will be apparent to those skilled in the art from the foregoing description which do not depart from the spirit of the invention. For this reason, these changes in structure are desired to be included within the scope of the present invention. The appended claims define the present invention; the foregoing description is to be employed for setting forth the present embodiments as illustrative in nature.

What is claimed is:

1. A corrosion test probe assembly suitable for determining the rate of corrosion of a metallic material in a corrodant by means of polarization measurements comprising:
   (a) a metallic body provided with an axial passageway and carrying an abutting shoulder adjacent said passageway,
   (b) a rigid insulator member positioned in said passageway and engaging said abutting shoulder whereby axial movement of said member within said body is restrained in at least one direction,
   (c) a resilient seal extending between said member and body to seal meeting surfaces of said member and body into a fluid tight relationship, (d) a plurality of metallic terminal pins integrally carried in said member in electrical isolation and extending from one end thereof, (e) a plurality of metallic electrodes secured at the exposed ends of said pins, (f) insulating fluid seals surrounding said pins and engaged axially in fluid tightness between presented sealing surfaces associated with said member and on said electrodes, (g) separate electrically conductive means extending through said member from said pins, and (h) means insulating said conductive means from each other and said body whereby said electrically conductive means form electrical circuits through said electrodes during polarization measurements.

2. The probe assembly of claim 1 wherein the resilient seal is provided by an elastomer molded into voids between the meeting surfaces of said member and body.

3. The probe assembly of claim 2 wherein the molded elastomer extends about the end of said member from which extend said pins and forms sealing surfaces about said pins to engage axially the insulating fluid seals surrounding said pins.

4. The probe of assembly of claim 1 wherein the resilient seal is a molded elastomer.

5. The probe assembly of claim 1 wherein the electrodes are dimensionally identical.

6. The probe assembly of claim 1 wherein said body is provided with a top portion having a polygonal configuration and a lower cylindrical portion having a threaded exterior side surface, said body having formed therein a cylindrical passageway extending axially therethrough, said abutting shoulder residing adjacent the top portion of said body, and a threaded sleeve to accept an electrical connector extend from said top portion of said body.

7. A corrosion test probe assembly suitable for determining the rate of corrosion of a metallic material in a corrodant by means of polarization measurements comprising:

(a) a metallic body provided with an axial passageway and carrying an abutting shoulder adjacent said passageway, (b) a rigid insulator member positioned in said passageway and engaging said abutting shoulder whereby axial movement of said member within said body is restrained in at least one direction, (c) a resilient seal extending between said member and body to seal meeting surfaces of said member and body into a fluid tight relationship, (d) a plurality of metallic electrical conductors integrally carried in said member in electrical isolation and extending axially from both ends thereof, one exposed end of each said conductors forming a terminal pin to receive a metallic electrode, and the other exposed end of each said conductors forming an external circuit connector, (e) a plurality of metallic electrodes secured to said terminal pins, (f) insulating fluid seals encircling said terminal pins and engaged axially in fluid tightness between presented sealing surfaces associated with said member and said electrodes, and (g) said circuit connectors providing circuits with said conductors through said electrodes during polarization measurements.

8. A corrosion test probe assembly for determining the rate of corrosion of a metallic material in a corrodant by means of polarization measurements comprising:

(a) a tubular metallic body provided with a top portion having a polygonal configuration and a lower cylindrical portion having a threaded exterior side surface, said body having formed therein a cylindrical passageway extending axially thereinto, and said body carrying an abutting shoulder adjacent said passageway, (b) a sleeve carried integrally at the top portion of said body and encircling said passageway, said sleeve exteriorly threaded to accept an electrical connector, (c) a rigid insulator member positioned in said passageway and engaging said abutting shoulder whereby axial movement of said member is restrained in at least one direction, said member having a cylindrical exterior surface spaced from said body to form an annulus therebetween, (d) a plurality of metallic electrical conductors integrally carried in said member in electrical isolation and extending from both ends of said member, (e) said conductors extending from said member at one end into said sleeve forming an external circuit connector, (f) said conductors extending from the other end of said member to provide terminal pins and metallic electrodes secured to said terminal pins, and (g) a resilient elastomer residing in the annulus between the meeting cylindrical surfaces of said body and said member to provide a fluid tight relationship therebetween, and said elastomer enclosing the end of said member from which protrude said terminal pins of said conductors receiving said metallic electrodes, and said elastomer forming cylindrical raised parts to provide an axial sealing surface encircling a portion of said terminal pins of said conductors.

References Cited

UNITED STATES PATENTS

| 3,381,260 | 4/1968 | Brown | 339—218 M |
|---|---|---|---|
| 3,406,101 | 10/1968 | Kilpatrick | 204—286 |
| 3,558,462 | 1/1971 | Wilson | 204—195 C |

FOREIGN PATENTS

| 955,432 | 4/1964 | Great Britain | 339—218 M |
|---|---|---|---|

WINSTON A. DOUGLAS, Primary Examiner

M. J. ANDREWS, Assistant Examiner

UNITED STATES PATENT OFFICE
CERTIFICATE OF CORRECTION

Patent No. 3,632,495  Dated January 4, 1972

Inventor(s) Frederick D. Watson and Weldon D. Mayse

It is certified that error appears in the above-identified patent and that said Letters Patent are hereby corrected as shown below:

Column 3, line 12, for "a abutting" should read ---an abutting---;

Column 4, line 23, cancel the numeral "2" and substitute therefor ---12---;

Column 4, line 74, for "be" read ---by---;

Column 8, the following claims should appear after claim 8:

9. The assembly of Claim 8 wherein said conductors have an intermediate non-linear portion embedded within said rigid insulator member whereby said conductors resist radial movement when torque forces are applied to ends of said conductors.

10. The assembly of Claim 8 wherein said conductors have an abuttment means embedded within said rigid insulator member to resist longitudinal displacing forces applied to ends of said conductors.

11. The assembly of Claim 8 wherein said rigid insulator member is formed of a glass filled epoxy material in which are embedded said conductors.

12. The assembly of Claim 8 wherein a radial surface extends substantially between said body and said cylindrical exterior surface of said insulator member, and said radial surface is located at one end of said annulus to contain said resilient elastomer within said annulus whereby said resilient elastomer is forced by fluid pressure in the annulus against said radial surface.

Signed and sealed this 22nd day of August 1972.

(SEAL)
Attest:

EDWARD M. FLETCHER, JR.
Attesting Officer

ROBERT GOTTSCHALK
Commissioner of Patents